US012780622B2

(12) United States Patent
Hill

(10) Patent No.: US 12,780,622 B2
(45) Date of Patent: Nov. 3, 2026

(54) HOIST TOOL AND ASSOCIATED SYSTEM AND METHOD

(71) Applicant: The Boeing Company, Arlington, VA (US)

(72) Inventor: Chester Hill, Grafton, IL (US)

(73) Assignee: The Boeing Company, Arlington, VA (US)

(*) Notice: Subject to any disclaimer, the term of this patent is extended or adjusted under 35 U.S.C. 154(b) by 324 days.

(21) Appl. No.: 18/671,611

(22) Filed: May 22, 2024

(65) Prior Publication Data

US 2025/0361126 A1 Nov. 27, 2025

(51) Int. Cl.
*B66D 1/28* (2006.01)
*B64F 5/10* (2017.01)
*B64F 5/50* (2017.01)

(52) U.S. Cl.
CPC .................................... *B66D 1/28* (2013.01)

(58) Field of Classification Search
CPC ................ B66D 1/28; B64F 5/10; B64F 5/50
See application file for complete search history.

(56) References Cited

U.S. PATENT DOCUMENTS

| | | | | |
|---|---|---|---|---|
| 2,622,540 | A * | 12/1952 | Stewart | B66C 1/18 414/800 |
| 2,702,729 | A * | 2/1955 | Havens | F16C 33/76 384/489 |
| 4,440,265 | A * | 4/1984 | Spagnoli | B66F 7/04 182/141 |
| 6,357,810 | B1 * | 3/2002 | Schwulst | B66C 1/10 294/67.5 |
| 7,159,912 | B2 * | 1/2007 | Gerhausser | B66C 1/12 294/81.2 |
| 7,481,756 | B2 * | 1/2009 | Derscheid | A01F 15/18 384/537 |
| 8,469,209 | B2 * | 6/2013 | Holmes | B66C 23/163 212/251 |
| 9,371,213 | B1 * | 6/2016 | Bernat | B66C 1/16 |
| 9,434,580 | B2 * | 9/2016 | Bakalyar | B66C 1/28 |
| 9,470,108 | B2 * | 10/2016 | Jacobs | F02K 1/54 |
| 10,260,375 | B2 * | 4/2019 | Jacobs | B64F 5/50 |
| 10,895,171 | B2 * | 1/2021 | Jacobs | B64F 5/50 |
| 11,040,784 | B2 * | 6/2021 | Brown | B64F 5/50 |

(Continued)

*Primary Examiner* — Bayan Salone
(74) *Attorney, Agent, or Firm* — Massey Bean & Lewis

(57) ABSTRACT

Disclosed herein is a hoist tool and associated system and method. The hoist tool includes a plurality of structure-attachment elements, each having a sleeve with an external annular groove, and configured to be attached to an assembled structure within an assembly jig at distinct locations. The hoist tool also includes a hoist frame. The hoist frame includes a structural framework, a plurality of jig-attachment features on the structure framework, and a plurality of clamping devices having opposing blade features that are configured to removably clamp to the external annular groove of a corresponding one of the plurality of structure-attachment elements. The hoist frame is configured to be removably coupled to the assembly jig, via the plurality of jig-attachment features and removably coupled to the assembled structure, via the plurality of clamping devices. When the hoist frame is removably coupled to the assembly jig and the assembled structure it is inhibited from imparting load to the assembled structure.

20 Claims, 11 Drawing Sheets

(56) References Cited

U.S. PATENT DOCUMENTS

| | | | | |
|---|---|---|---|---|
| 11,181,143 | B2 * | 11/2021 | Baehr | F16C 17/26 |
| 11,199,110 | B2 * | 12/2021 | Jacobs | F02K 1/54 |
| 2008/0022864 | A1 * | 1/2008 | Derscheid | F16C 13/02<br>100/88 |
| 2011/0204006 | A1 * | 8/2011 | Jacobs | F02K 1/54<br>211/13.1 |
| 2012/0228254 | A1 * | 9/2012 | Holmes | B66C 23/163<br>212/242 |
| 2017/0030225 | A1 * | 2/2017 | Jacobs | B64F 5/50 |
| 2019/0118977 | A1 * | 4/2019 | Brown | B64F 5/50 |
| 2019/0242273 | A1 * | 8/2019 | Jacobs | B64F 5/50 |
| 2021/0317757 | A1 * | 10/2021 | Jacobs | F01D 25/285 |

* cited by examiner

HOIST TOOL AND ASSOCIATED SYSTEM AND METHOD

FIELD

This disclosure relates generally to a hoist tool, and, more particularly, to a hoist tool capable of non-load inducing attachment to an assembled structure.

BACKGROUND

Large structures (i.e., assembled structures), such as aircraft parts, are commonly assembled within specialized assembly jigs. These assembled structures require extraction from the assembly jig using a hoist tool after assembly. Conventionally, when extracting an assembled structure from the assembly jig, a hoist tool is attached to the assembled structure in a cantilevered fashion, meaning the hoist tool is attached to the assembled structure in such a way that it extends outward without additional support, relying solely on the connection to the assembled structure for stability. Consequently, the weight of the hoist tool contributes load to the assembled structure, potentially causing structural strain and damage to the assembled structure during attachment of the hoist tool to the assembled structure.

SUMMARY

The subject matter of the present application has been developed in response to the present state of the art, and in particular, in response to the problems of and needs created by, or not yet fully solved by, existing hoist tools. Generally, the subject matter of the present application has been developed to provide a hoist tool, and an associated system and a method, that overcomes at least some of the above-discussed shortcomings of prior art techniques.

Disclosed herein in a hoist tool that includes a plurality of structure-attachment elements. Each one of the plurality of structure-attachment elements includes a sleeve, with an external annular groove, and is configured to be attached to an assembled structure within an assembly jig at distinct locations. The hoist tool also includes a hoist frame. The hoist frame includes a structural framework, a plurality of jig-attachment features on the structural framework, and a plurality of clamping devices. Each one of the plurality of clamping devices includes opposing blade features, which are selectively adjustable, is coupled to the structural framework, and is configured to be removably clamped to the external annular groove of a corresponding one of the plurality of structure-attachment elements. The hoist frame is configured to be removably coupled to the assembly jig, via the plurality of jig-attachment features. The hoist frame is also configured to be removably coupled to the assembled structure, via the plurality of clamping devices. When the hoist frame is removably coupled to the assembly jig and removably coupled to the assembled structure, the hoist frame is inhibited from imparting load to the assembled structure. The preceding subject matter of this paragraph characterizes example 1 of the present disclosure.

Each one of the plurality of jig-attachment features includes a bushing that is configured to engage with a pin on the assembly jig. The preceding subject matter of this paragraph characterizes example 2 of the present disclosure, wherein example 2 also includes the subject matter according to example 1, above.

Each one of the plurality of structure-attachment elements includes an attachment plate having a plurality of fastening apertures. The attachment plate is configured to be attachable to the assembled structure via fasteners inserted through the fastening apertures. The preceding subject matter of this paragraph characterizes example 3 of the present disclosure, wherein example 3 also includes the subject matter according to any of examples 1-2, above.

Each one of the plurality of structure-attachment elements includes an interfacing plate attached to the attachment plate by at least one mating-pin of one of the interfacing plate or the attachment plate. The sleeve is coupled to and extends from the interfacing plate. The preceding subject matter of this paragraph characterizes example 4 of the present disclosure, wherein example 4 also includes the subject matter according to example 3, above.

The opposing blade features includes a first blade feature and a second blade feature, opposing the first blade feature. At least one of the first blade feature or the second blade feature is selectively movable towards or away from the other. The preceding subject matter of this paragraph characterizes example 5 of the present disclosure, wherein example 5 also includes the subject matter according to any of examples 1-4, above.

The first blade feature has a v-shape with two linear sidewalls. A portion of each linear sidewall is configured to engage with the external annular groove of a corresponding one of the plurality of structure-attachment elements to provide a clamping force to the external annular groove. The preceding subject matter of this paragraph characterizes example 6 of the present disclosure, wherein example 6 also includes the subject matter according to example 5, above.

Each one of the plurality of clamping devices includes an adjustment element that is coupled to the first blade feature and is configured to selectively move the first blade feature along a blade axis towards or away from the second blade feature. The adjustment element includes a pivoting head such that the first blade feature is selectively pivotable about the blade axis in a rotational direction, as the first blade feature is selectively moved along the blade axis. The preceding subject matter of this paragraph characterizes example 7 of the present disclosure, wherein example 7 also includes the subject matter according to example 5, above.

At least a portion of the second blade feature is configured to engage with the external annular groove of a corresponding one of the plurality of structure-attachment elements and is configured to provide a clamping force to the external annular groove. The preceding subject matter of this paragraph characterizes example 8 of the present disclosure, wherein example 8 also includes the subject matter according to example 5, above.

The hoist tool includes a securement pin configured to extend through a pin aperture of an extension coupler extending from the structural framework of the hoist frame and through the sleeve of a corresponding one of the plurality of structure-attachment elements when the hoist frame is removably coupled to the assembled structure. The preceding subject matter of this paragraph characterizes example 9 of the present disclosure, wherein example 9 also includes the subject matter according to any of examples 1-8, above.

The plurality of structure-attachment elements includes at least three structure-attachment elements. The preceding subject matter of this paragraph characterizes example 10 of the present disclosure, wherein example 10 also includes the subject matter according to any of examples 1-9, above.

Further disclosed herein is a hoist system. The hoist system includes an assembly jig, an assembled structure within the assembly jig, and a hoist tool. The hoist tool includes a plurality of structure-attachment elements. Each one of the plurality of structure-attachment elements includes a sleeve, with an external annular groove, and is configured to be attached to an assembled structure within an assembly jig at distinct locations. The hoist tool also includes a hoist frame. The hoist frame includes a structural framework, a plurality of jig-attachment features on the structural framework, and a plurality of clamping devices. Each one of the plurality of clamping devices includes opposing blade features, which are selectively adjustable, is coupled to the structural framework, and is configured to be removably clamped to the external annular groove of a corresponding one of the plurality of structure-attachment elements. The hoist frame is configured to be removably coupled to the assembly jig, via the plurality of jig-attachment features. The hoist frame is also configured to be removably coupled to the assembled structure, via the plurality of clamping devices. When the hoist frame is removably coupled to the assembly jig and removably coupled to the assembled structure, the hoist frame is inhibited from imparting load to the assembled structure. The preceding subject matter of this paragraph characterizes example 11 of the present disclosure.

The assembly jig includes a main body and a plurality of mounting fixtures extending perpendicularly from the main body. Each one of the plurality of mounting fixtures includes a mount and at least one linear rail. The mount is selectively slidable along the at least one linear rail to move the mount toward or away from the main body. The preceding subject matter of this paragraph characterizes example 12 of the present disclosure, wherein example 12 also includes the subject matter according to example 11, above.

The mount of each one of the plurality of mounting fixtures of the assembly jig includes a pin. Each one of the plurality of jig-attachment features of the hoist frame includes a bushing. The bushing is configured to engage with the pin of the mount of a corresponding one of the plurality of mounting fixtures to removably couple the hoist frame to the assembly jig. The preceding subject matter of this paragraph characterizes example 13 of the present disclosure, wherein example 13 also includes the subject matter according to example 12, above.

The hoist system includes a securement pin configured to extend through a pin aperture in the structural framework of the hoist frame and through the sleeve of a corresponding one of the plurality of structure-attachment elements when the hoist frame is removably coupled to the assembled structure. The preceding subject matter of this paragraph characterizes example 14 of the present disclosure, wherein example 14 also includes the subject matter according to any of examples 11-13, above.

The assembled structure is an assembled aircraft structure. The preceding subject matter of this paragraph characterizes example 15 of the present disclosure, wherein example 15 also includes the subject matter according to any of examples 11-14, above.

Further disclosed herein is a method of coupling a hoist tool to an assembled structure within an assembly jig. The method includes removably attaching a plurality of structure-attachment elements of the hoist tool to the assembled structure at distinct locations on the assembled structure. The method also includes removably coupling a corresponding one of a plurality of jig-attachment features, of a hoist frame of the hoist tool, to a corresponding one of a plurality of mounting fixtures of the assembly jig. The assembly jig supports a load of the hoist frame. The method further includes removably clamping a plurality of clamping devices of the hoist frame to a corresponding one of the plurality of structure-attachment elements to secure the hoist frame to the assembled structure without imparting the load of the hoist frame to the assembled structure. The preceding subject matter of this paragraph characterizes example 16 of the present disclosure.

The method includes selectively sliding the hoist frame along at least one linear rail of the corresponding one of the plurality of mounting fixtures to slide the plurality of clamping devices of the hoist frame proximate to a corresponding one of the plurality of structure-attachment elements attached to the assembled structure. The preceding subject matter of this paragraph characterizes example 17 of the present disclosure, wherein example 17 also includes the subject matter according to example 16, above.

The step of removably clamping the plurality of clamping devices on the hoist frame to the corresponding one of the plurality of structure-attachment elements includes selectively adjusting opposing blade features of the plurality of clamping devices to apply a clamping force to an external annular groove of the corresponding one of the plurality of structure-attachment elements. The preceding subject matter of this paragraph characterizes example 18 of the present disclosure, wherein example 18 also includes the subject matter according to any of examples 16-17, above.

The method includes selectively pivoting at least one of the opposing blade features about a blade axis in a rotational direction to align the opposing blade feature with the external annular groove of the corresponding one of the plurality of structure-attachment elements. The preceding subject matter of this paragraph characterizes example 19 of the present disclosure, wherein example 19 also includes the subject matter according to example 18, above.

The method includes removing the assembled structure from the assembly jig by lifting the hoist tool via a hoist attached to the hoist frame. The preceding subject matter of this paragraph characterizes example 20 of the present disclosure, wherein example 20 also includes the subject matter according to any of examples 16-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a hoist tool and associated system and method. The following provides some features of at least some examples of the hoist tool and associated system and method. The hoist tool is utilized to extract an assembled structure from an assembly jig without imparting a load on the assembled structure from a hoist frame. In some examples, the hoist tool includes a hoist frame and multiple structure-attachment elements that are configured to be attached to the assembled structure and clamped to the hoist frame. The hoist frame is couplable to the assembly jig, which supports the weight of the hoist frame when coupled. That is, the hoist frame is inhibited from imparting a load to the assembled structure, as its weight is supported by the assembly jig. Once the hoist frame is securely coupled to the assembly jig, the multiple structure-attachment elements, which are previously attached to the assembled structure, can be clamped to the hoist frame, thereby coupling the assembled structure to the hoist frame. Moreover, the hoist tool allows for variability in the clamping of the multiple structure-attachment elements to the hoist frame, which helps accommodate differences in attachment points resulting from allowable assembly variations. Accordingly, as the hoist frame is supported by the assembly jig, the assembled structure can be attached to the hoist frame and removed from the assembly jig without inducing potentially damaging loads to the assembled structure during a hoist operation.

Figure 1:
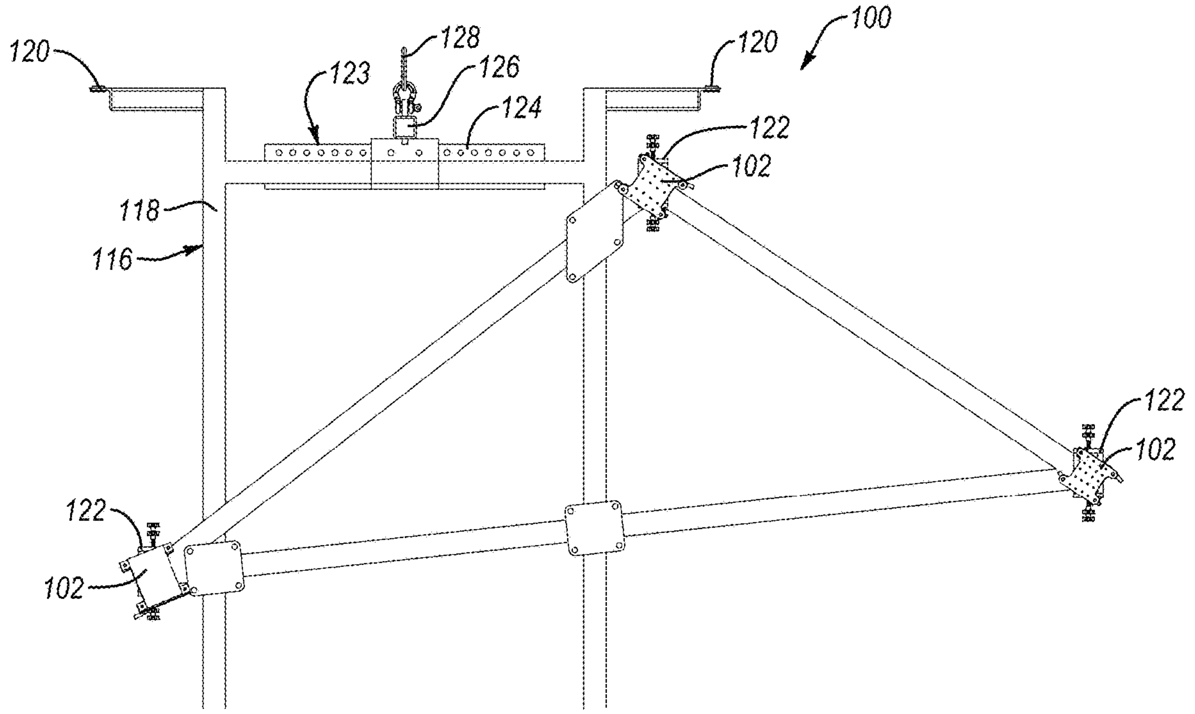
FIG. 1 is a schematic perspective view of a hoist tool, according to one or more examples of the present disclosure.

Referring to FIG. 1, one example of a hoist tool 100 is shown. The hoist tool 100 includes a hoist frame 116 and a plurality of structure-attachment elements 102, which are clampable to the hoist frame 116. The plurality of structure-attachment elements 102 are configured to be attached to an assembled structure within an assembly jig at distinct locations (i.e., individual positions) within the assembled structure. As shown, the plurality of structure-attachment elements 102 are clamped to the hoist frame 116, without an attached assembled structure. The hoist tool 100 may include any number of structure-attachment elements 102, including more or less than the three structure-attachment elements 102 shown. Additionally, the hoist frame 116 may have any number of configurations, and is not limited to the configuration shown.

The hoist frame 116 includes a structural framework 118, which serves as the foundational support structure for the hoist tool 100. The structural framework 118 defines the overall shape and size of the hoist frame 116. In some examples, the structural framework 118 is configured to correspond with the shape and size of an assembled structure, which the hoist frame 116 will be attached to during a hoist operation. The structural framework 118 may include multiple, interconnected sections, such as the rectangular section, which is configured to be attached to an assembly jig, and the triangular section, which is configured to be clamped to the plurality of structure-attachment elements 102, as shown. Some sections of the structural framework 118 may be offset from other sections to accommodate a center of gravity of the hoist tool 100 when connected to an assembled structure. In other examples, the structural framework 118 has one section, which consolidates the attachment mechanism and the plurality of structure-attachment elements 102 on the same section of framework. The structural framework 118 may be formed from elongated and interconnected rods, which may have various shapes and sizes. Additionally, in certain examples, the structural framework 118 is a rigid framework and may be made from any of various materials that maintain rigidity during a hoist operation.

The hoist frame 116 includes a plurality of jig-attachment features 120 on the structural framework 118. The plurality of jig-attachment features 120 are configured to couple the hoist frame 116 to an assembly jig. The hoist frame 116 may include any number of jig-attachment features 120 including more than the two jig-attachment features 120 shown. The plurality of jig-attachment features 120 are typically positioned at or near to an upper end of the hoist frame 116, where the upper end is configured to be connected to a hoist during a hoist operation. Once coupled to an assembly jig, the plurality of jig-attachment features 120 allow the weight of the hoist frame 116 to be supported by the assembly jig, such that the weight is borne by the assembly jig and not imparted to an assembled structure later attached to the hoist frame 116. Moreover, in some examples, the plurality of jig-attachment features 120 may be aligned in parallel arrangement, such that once coupled, the hoist frame 116 hangs vertically downward from the plurality of jig-attachment features 120.

The hoist frame 116 also includes a plurality of clamping devices 122 coupled to the structural framework 118. Each one of the plurality of clamping devices 122 includes opposing blade features, which are selectively adjustable (i.e. movable) and configured to be removably clamped to a corresponding one of the plurality of structure-attachment elements 102, as further explained below in reference to FIG. 3. Accordingly, the hoist frame 116 is configured to be removably coupled to an assembled structure, via the plurality of clamping devices 122. The plurality of clamping devices 122 are located on the structural framework 118 proximate to a placement of a corresponding one of the plurality of structure-attachment elements 102. Hence, the hoist tool 100 is equipped with an equal number of clamping devices 122 as there are structure-attachment elements 102. In some examples, the hoist frame 116 may include three clamping devices 122, where the three clamping devices establish a common plane for securing the plurality of structure-attachment elements 102.

Figure 2A:
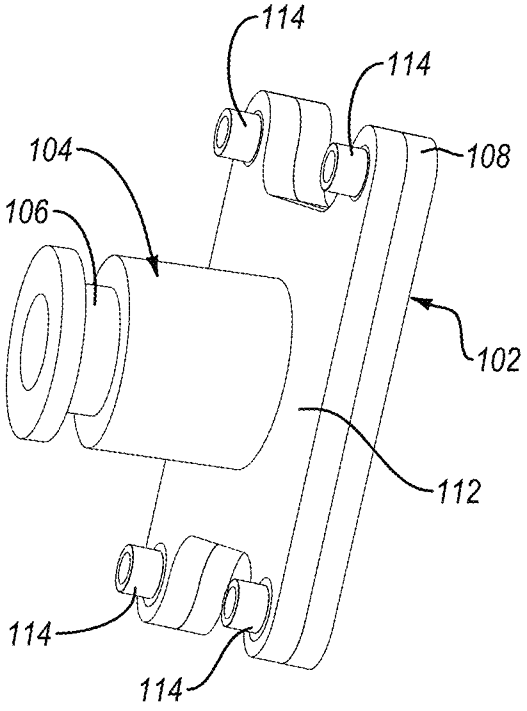
FIG. 2A is a schematic perspective view of one side of a structure-attachment element of the hoist tool, according to one or more examples of the present disclosure.
Figure 2B:
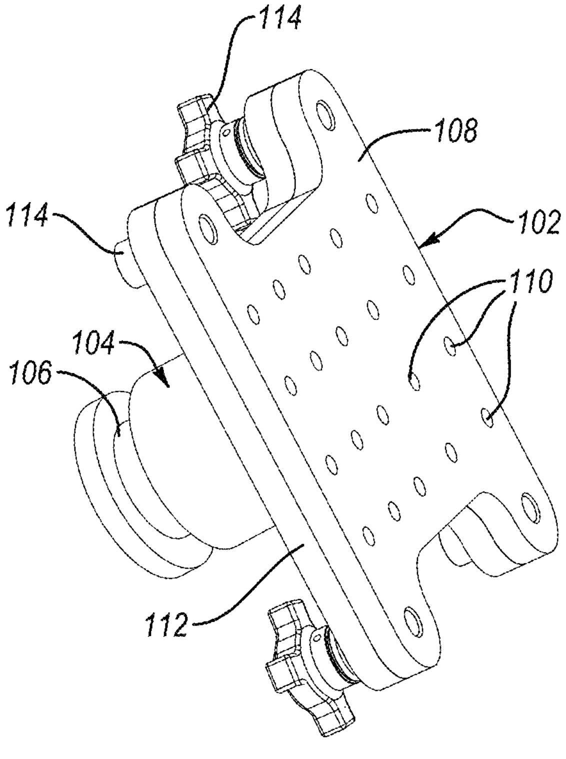
FIG. 2B is a schematic perspective view of another side of the structure-attachment element of FIG. 2A, according to one or more examples of the present disclosure.

Referring to FIGS. 2A and 2B, an example of one of the plurality of structure-attachment elements 102 of the hoist tool 100 is shown. Each one of the plurality of structure-attachment elements 102 includes a sleeve 104, a hollow cylindrical component featuring an external annular groove 106 encircling an outer circumference of the sleeve 104. That is, the external annular groove 106 is a channel or recess that runs around the outer circumference of the sleeve 104 in a ring-like fashion, allowing other components to be attached to the sleeve 104 by engaging with the external annular groove 106. The plurality of structure-attachment elements 102 also includes an attachment plate 108 that has a plurality of fastening apertures 110. The plurality of fastening apertures 110 serves as points of attachment for attaching corresponding ones of the plurality of structure-attachment elements 102 to distinct locations on an assembled structure, via fasteners inserted through the fastening apertures 110. Fasteners may be any fastening device such as screws, pin, etc. The plurality of fastening apertures 110 may be used to accommodate various attachment configurations, as the plurality of fastening apertures 110 may feature differently-sized or surplus apertures. This flexibility allows for optimal utilization of fastening points for attachment to an assembled structure. In some examples, the plurality of structure-attachment elements 102 further includes an interfacing plate 112 that is attached to the attachment plate 108. The sleeve 104 is coupled to and extends from the interfacing plate 112. In some examples, the sleeve 104 extends perpendicularly from the interfacing plate 112. At least one mating-pin 114 or other coupling mechanism is utilized to secure the interfacing plate 112 to the attachment plate 108. In other examples, the attachment plate 108 and the interfacing plate 112 are merged into a single plate, such that the single plate includes both the sleeve 104 and the plurality of fastening apertures 110.

Figure 3:
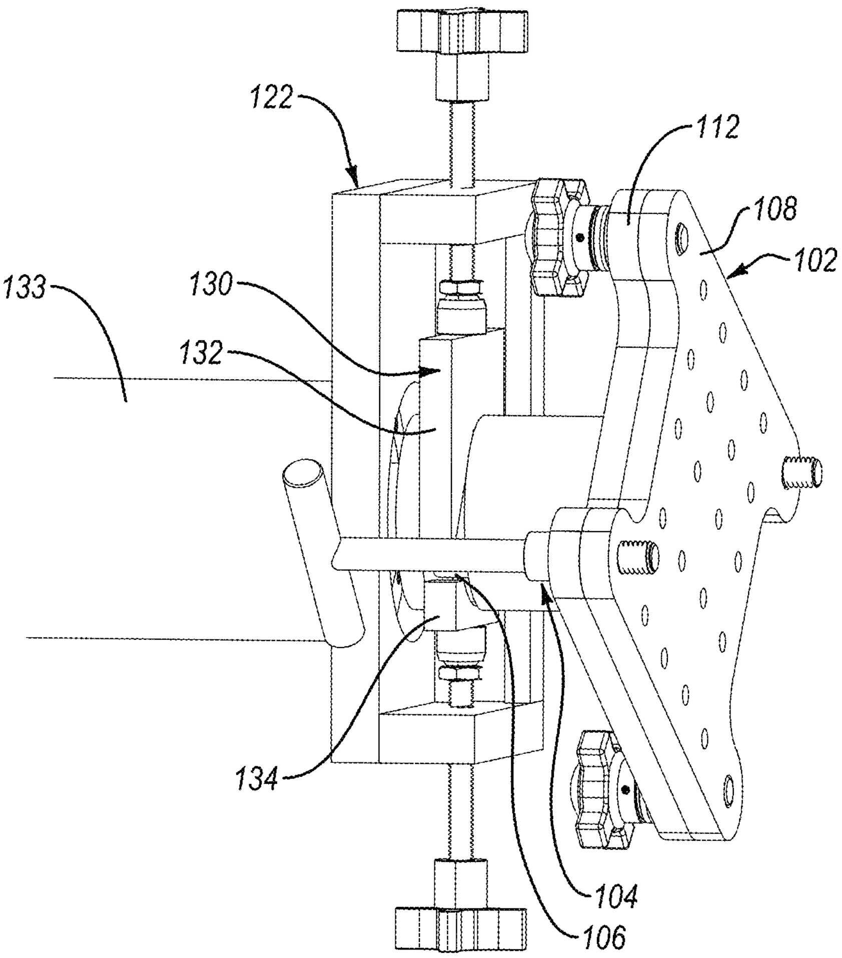
FIG. 3 is a schematic perspective view of a clamping device of a hoist frame clamped to a structure-attachment element of the hoist tool, according to one or more examples of the present disclosure.

As shown in FIG. 3, the plurality of clamping devices 122 are clampable to the plurality of structure-attachment elements 102, via opposing blade features 130. The opposing blade features 130 includes a first blade feature 132 and a second blade features 134, opposing the first blade feature 132. At least one of the first blade feature 132 or the second blade feature 134 is selectively movable towards or away from the other blade, allowing the opposing blade features 130 to be utilized to clamp the external annular groove 106 of the corresponding one of the plurality of structure-attachment elements 102. The clamping of the opposing blade features 130 to the external annular groove 106 ensures a secure hold, firmly attaching the clamping device to the corresponding one of the plurality of structure-attachment elements 102 and providing support for an attached assembled structure. Accordingly, the opposing blade features 130 are configured to provide opposing clamping force to the external annular groove 106. Moreover, at least a portion of each one of the opposing blade features 130 is configured to engage (i.e., contact) with the external annular groove 106 to provide the clamping force. Depending on the orientation of the clamping device, in some examples, the first blade feature 132 is an upper blade that is configured to provide downward clamping force on the external annular groove 106, and the second blade feature 134 is a lower blade that is configured to provide upward clamping force on the external annular groove 106. The opposing blade features 130 may be adjusted towards or away from the external annular groove 106 by a corresponding adjustment element 138. The adjustment element 138 may either be manually adjusted, such as by a hand-operated threaded pin, or automatically adjusted, such as by an integrated motorized mechanism.

The opposing blade features 130 may have various shapes and sizes that correspond to the external annular groove 106. As more clearly shown in FIG. 4A, in some examples, the first blade feature 132 may have a v-shaped blade, having two linear sidewalls 136. A portion of each linear sidewall 136 is configured to engage with the external annular groove 106 of a corresponding one of the plurality of structure-attachment elements 102, such that the first blade feature 132 has two points of contact on the external annular groove 106 when clamped. In some examples, the second blade feature 134 may also have a v-shape blade that is configured to engage with the external annular groove 106 at two points. Conversely, the second blade feature 134 (or the first blade feature 132) may have other shapes, such a contoured blade that has a concave curve designed to correspond with the curvature of the external annular groove 106. The second blade feature 134 may also have a flat blade that is designed to provide one point of contact with the external annular groove 106, such that which combined with a v-shaped blade provides three points of contact with the external annular groove 106.

Figure 4A:
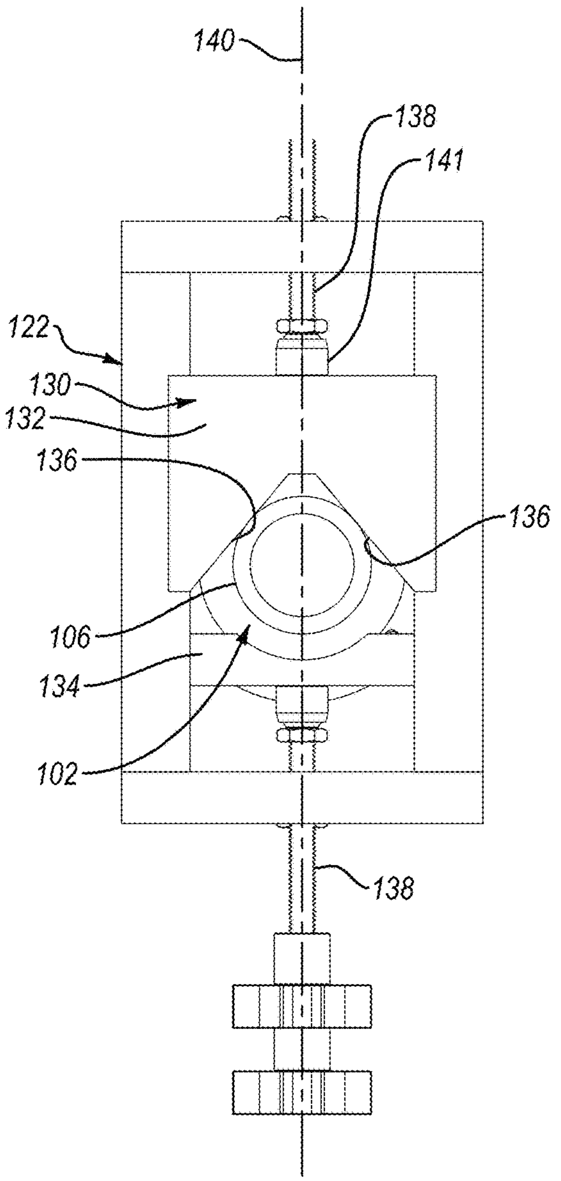
FIG. 4A is a schematic, front, partial view of a clamping device of a hoist frame clamped onto a structure-attachment element of the hoist tool, with a blade feature in a first alignment, according to one or more examples of the present disclosure.
Figure 4B:
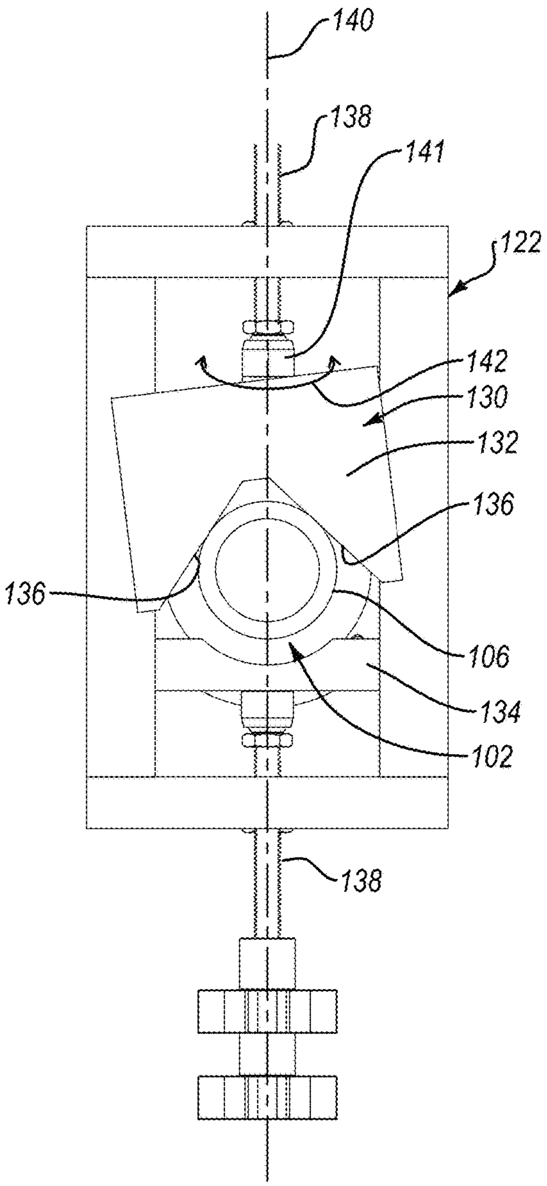
FIG. 4B is a schematic, front, partial view of the clamping device of FIG. 4A, with the blade feature in a second alignment, according to one or more examples of the present disclosure.

As shown in FIG. 4A, at least one of the first blade feature 132 or the second blade feature 134 is selectively movable by a corresponding adjustment element 138 along a blade axis 140, allowing movement towards and away from a center of the sleeve 104, which is clamped between the blades. That is, an orientation of the first blade feature 132 and the second blade feature 134 remains consistent during movement of the blades. Moreover, in some examples, the plurality of clamping devices 122 may allow for variability in the clamping of the sleeve 104 by the opposing blade features 130, such as in cases where the sleeve 104 is not evenly centered within the corresponding one of the plurality of clamping devices 122. As shown in FIG. 4B, the adjustment element 138 of the first blade feature 132 includes a pivoting head 141. The pivoting head 141 allows the first blade feature 132 to be selectively pivotable about the blade axis 140 in a rotational direction 142, as the blade is moved along the blade axis 140. For example, the first blade feature 132 can pivotable in the rotational direction 142, about the blade axis 140, rotating the first blade feature 132 to change its angle, relative to its initial position, as depicted in FIG. 4A, to shift the contact points on the sleeve 104. Accordingly, the pivoting head 141 allows for variability in clamping the sleeve 104 with the corresponding one of the plurality of clamping devices 122 in cases where the sleeve 104 is not evenly centered within the clamping device. In some examples, the second blade feature 134 also have a pivoting head 141, allowing the second blade feature 134 to pivot as the blade is moved along the blade axis 140. In yet other examples, only one of the opposing blade features 130 has a pivoting head 141.

Figure 5:
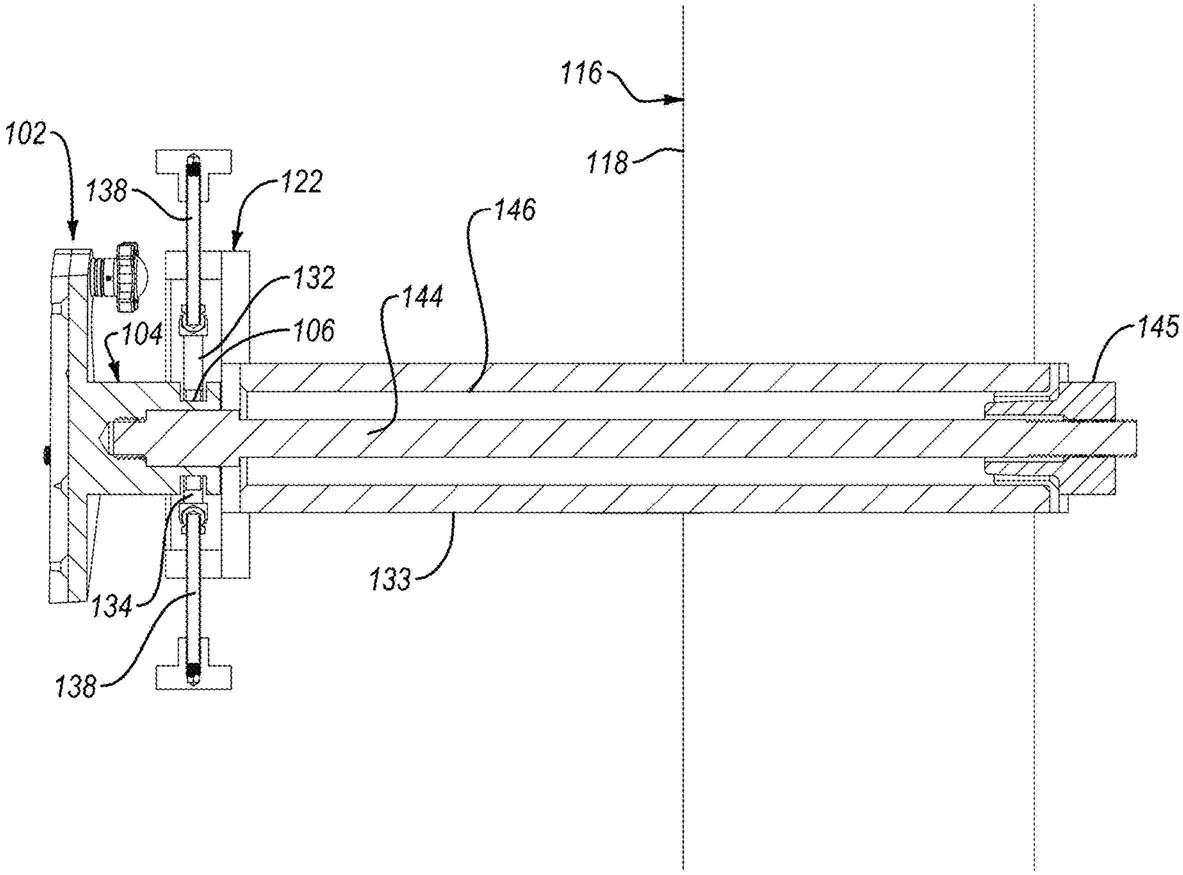
FIG. 5 is a schematic, side, cross-sectional view of a clamping device of a hoist frame clamped onto a structure-attachment element of the hoist tool, with a securement pin extending through the hoist frame and a sleeve of the structure-attachment element, according to one or more examples of the present disclosure.

Shown in FIG. 5 is a cross sectional view of a clamped one of the plurality of clamping devices 122 and a corresponding one of the plurality of structure-attachment elements 102. Each one of the plurality of clamping devices 122 extends from the structural framework 118 of the hoist frame 116 by an extension coupler 133. The extension coupler 133 is a hollow cylindrically tube that defines a pin aperture 146 and couples a corresponding one of the plurality of clamping devices 122 to the structural framework 118. In some cases, the extension coupler 133 may be integrally formed with the structural framework 118. The sleeve 104 of each one of the plurality of structure-attachment elements 102 is also hollow, which helps to ensure that when the corresponding one of the plurality of structure-attachment elements 102 is clamped to the clamping device 122, the hollow opening of the sleeve 104 is aligned with the pin aperture 146. A securement pin 144 is configured to extend through the pin aperture 146 of the extension coupler 133 and into the hollow opening of the sleeve 104 of the corresponding one of the plurality of structure-attachment elements 102 to secure the structure-attachment element to the hoist frame 116. A nut 145 may be threaded onto the securement pin 144 to maintain a position of the securement pin 144. Moreover, the securement pin 144 is configured to stabilize the corresponding one of the plurality of structure-attachment elements 102, relative to the hoist frame 116, in a direction perpendicular to the blade axis 140, whereas opposing blade features 130 stabilize the structure-attachment element 102 in a direction of the blade axis 140.

Figure 6:
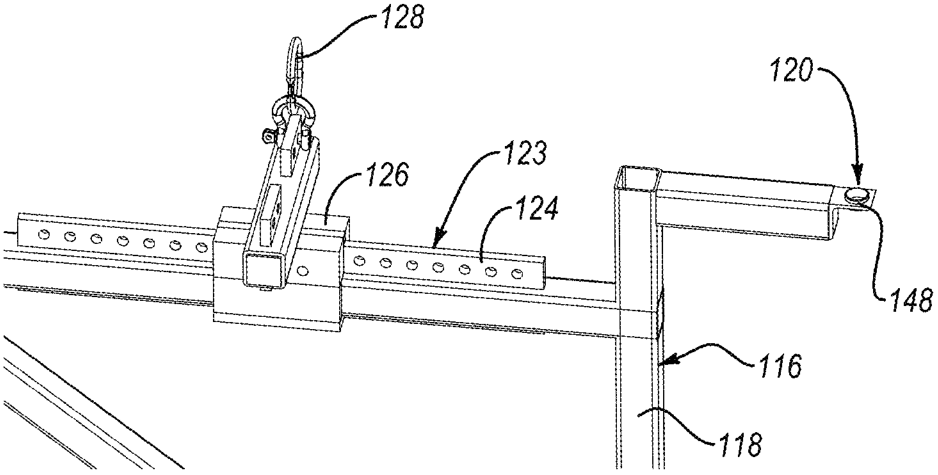
FIG. 6 is a schematic, perspective, partial view of a hoist frame, according to one or more examples of the present disclosure.

Referring to FIG. 6, the upper end 123 of the hoist frame 116 is configured to be attachable to a hoist. The upper end 123 includes a hoist-cable coupler 126 that is connectable to a hoist, via a hoist cable 128. In some examples, the hoist-cable coupler 126 is fixed in position at the upper end 123 of the hoist frame 116. In other examples, the hoist-cable coupler 126 is movable along a hoist rail 124, allowing a position of the hoist-cable coupler 126 to be adjusted to accommodate a change in a center of gravity of the hoist frame 116. Adjustment of the center of gravity ensures stability and balance of the hoist tool 100 and an attached assembled structure during hoisting operations.

Figure 7:
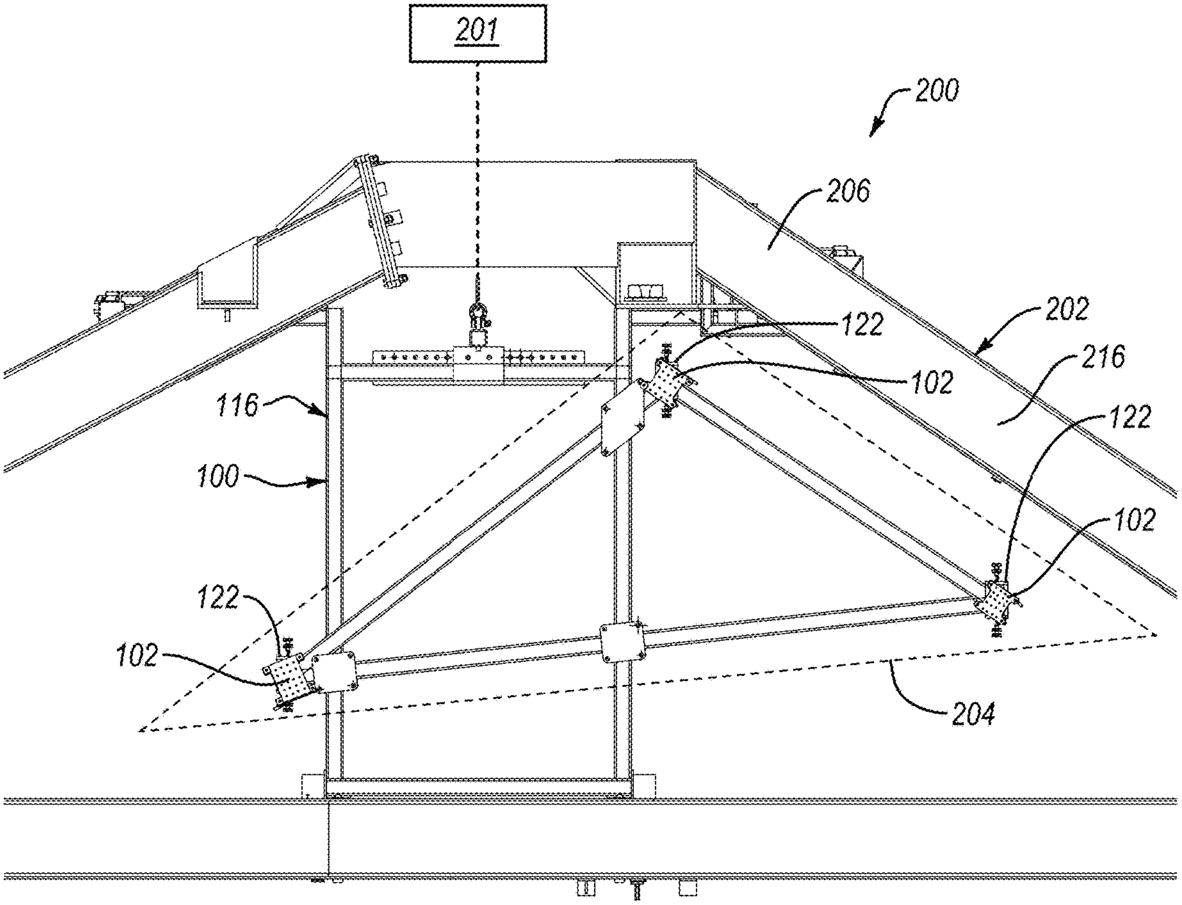
FIG. 7 is a schematic side view of an assembled structure within an assembly jig, with a hoist frame attached to the assembly jig, according to one or more examples of the present disclosure.
Figure 8:
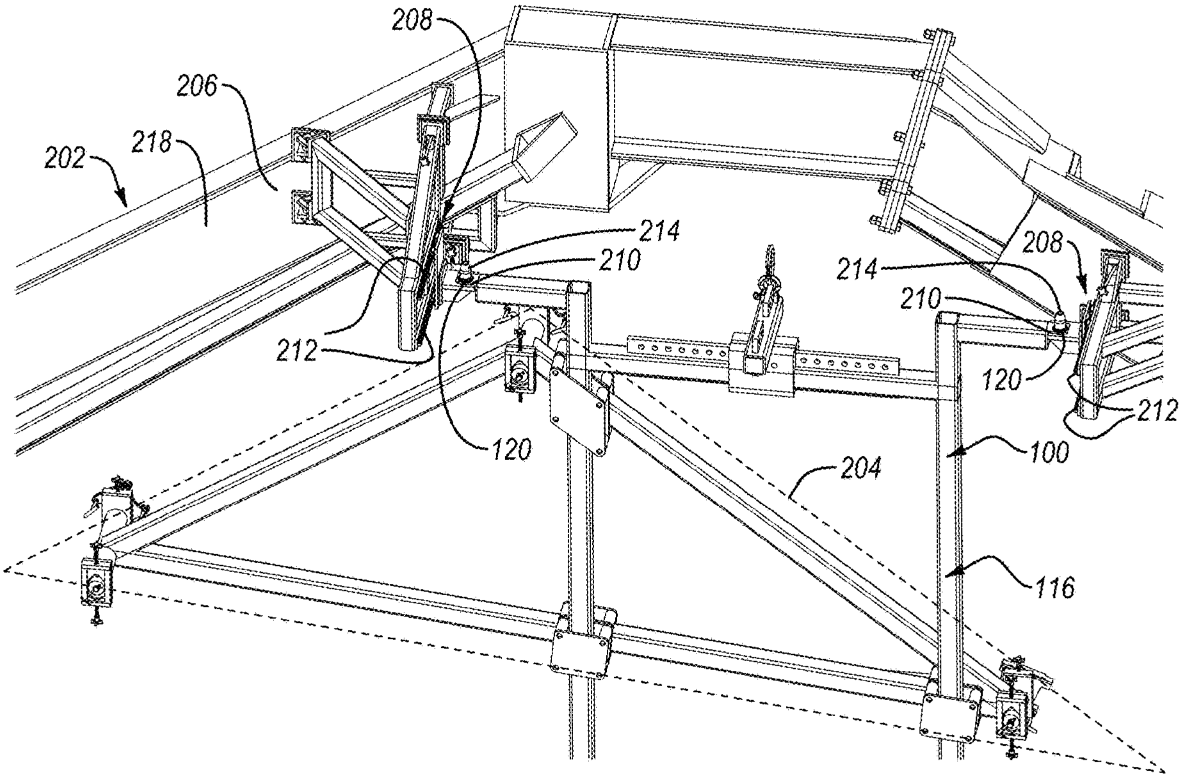
FIG. 8 is a schematic, perspective, partial view of the assembled structure within the assembly jig, with the hoist frame attached to the assembly jig of FIG. 7, according to one or more examples of the present disclosure.

Shown in FIGS. 7-9 is a hoist system 200 that includes an assembly jig 202. The assembly jig 202 is a specialized fixture used for the manufacturing and assembly of an assembled structure 204 and includes a main body 206 that holds components of the assembled structure 204 in place as the assembled structure 204 is assembled. The assembly jig 202 may be used to assemble an assembled structure 204 for industries such as aerospace, automotive, and manufacturing. For examples, the assembly jig 202 may be used to assemble an assembled aircraft structure, such as an aircraft wing, fuselage sections, empennage components, landing gear assemblies, control surfaces, etc. In the figures, the assembled structure 204 is represented by a dotted line, serving as a visual reference for any structure that could be assembled within and later removed from the assembly jig 202. In order to remove the assembled structure 204 from the assembly jig 202, a hoist tool 100, connected to a hoist 201, is utilized. Shown in FIG. 7 is a first side 216 of the assembly jig 202, which provides a view of the assembly jig's configuration opposite of a side where the assembled structure 204 is assembled. The first side 216 may be utilized for accessing and securing components to the structure during assembly. Shown in FIG. 8 is a second side 218 of the assembly jig 202, which is the primary assembly area where the assembled structure 204 is assembled. The second side 218 accommodates the attachment of the hoist tool 100 for lifting the assembled structure 204 out of the assembly jig 202.

The second side 218 of the assembly jig 202 includes a plurality of mounting fixtures 208, each extending perpendicularly from the main body 206. That is, the plurality of mounting fixtures 208 extend parallel to a ground surface on which the assembly jig 202 is placed. The plurality of mounting fixtures 208 are used to facilitate the secure attachment and positional adjustment of the hoist frame 116. Specifically, each one of the plurality of mounting fixtures 208 includes a mount 210 and at least one linear rail 212. The mount 210 is equipped with an attachment and rolling mechanism that allows the mount 210 to be attached to and selectively slidable along the at least one linear rail 212 to move the mount 210 towards or away from the main body 206. Accordingly, when the hoist frame 116 is attached to the plurality of mounting fixtures 208, the hoist frame 116 can slide along the at least one linear rail 212 to move the hoist frame 116, relative to the assembly jig 202.

Figure 9A:
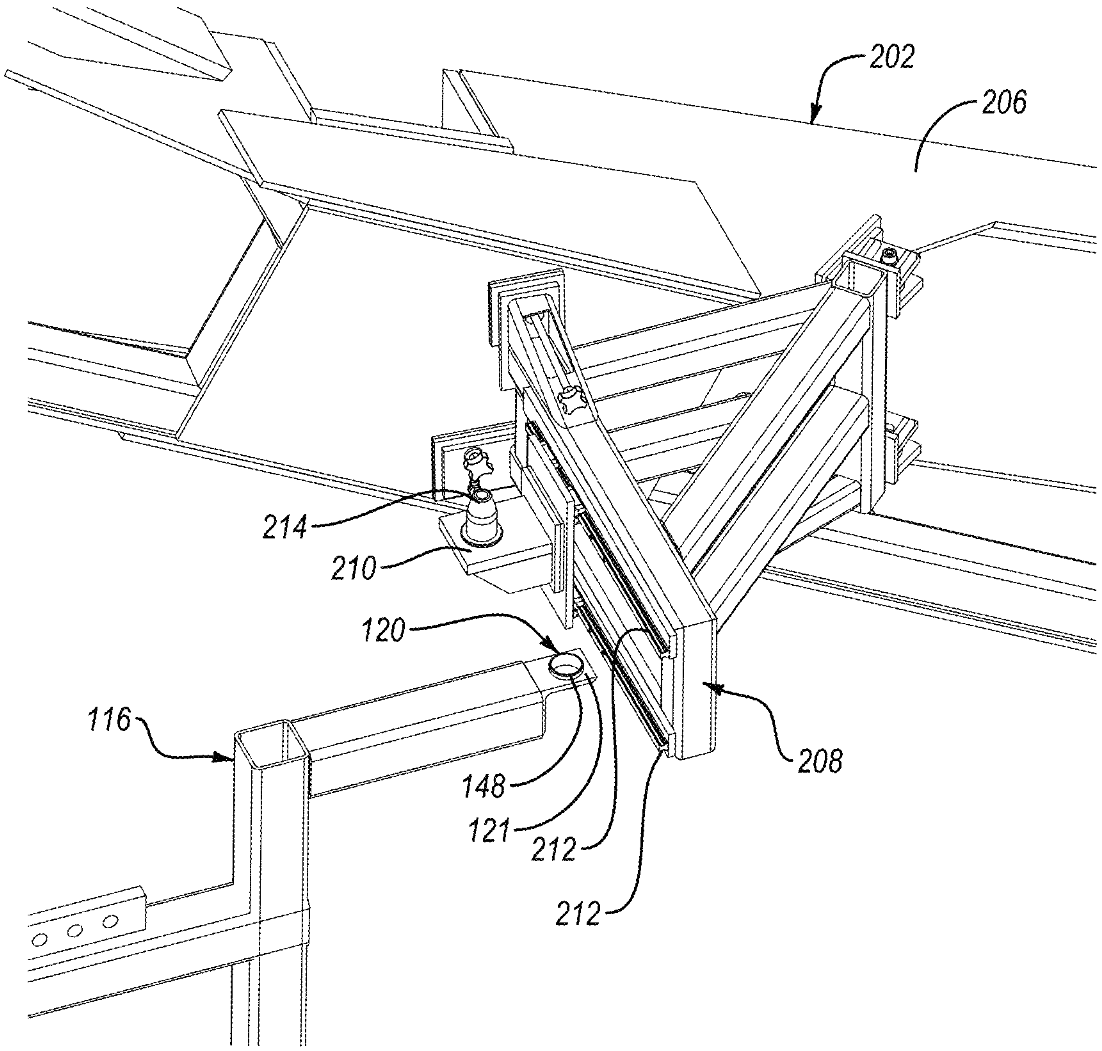
FIG. 9A is a schematic perspective view of a mounting fixture of an assembly jig, with an uncoupled hoist frame, according to one or more examples of the present disclosure.
Figure 9B:
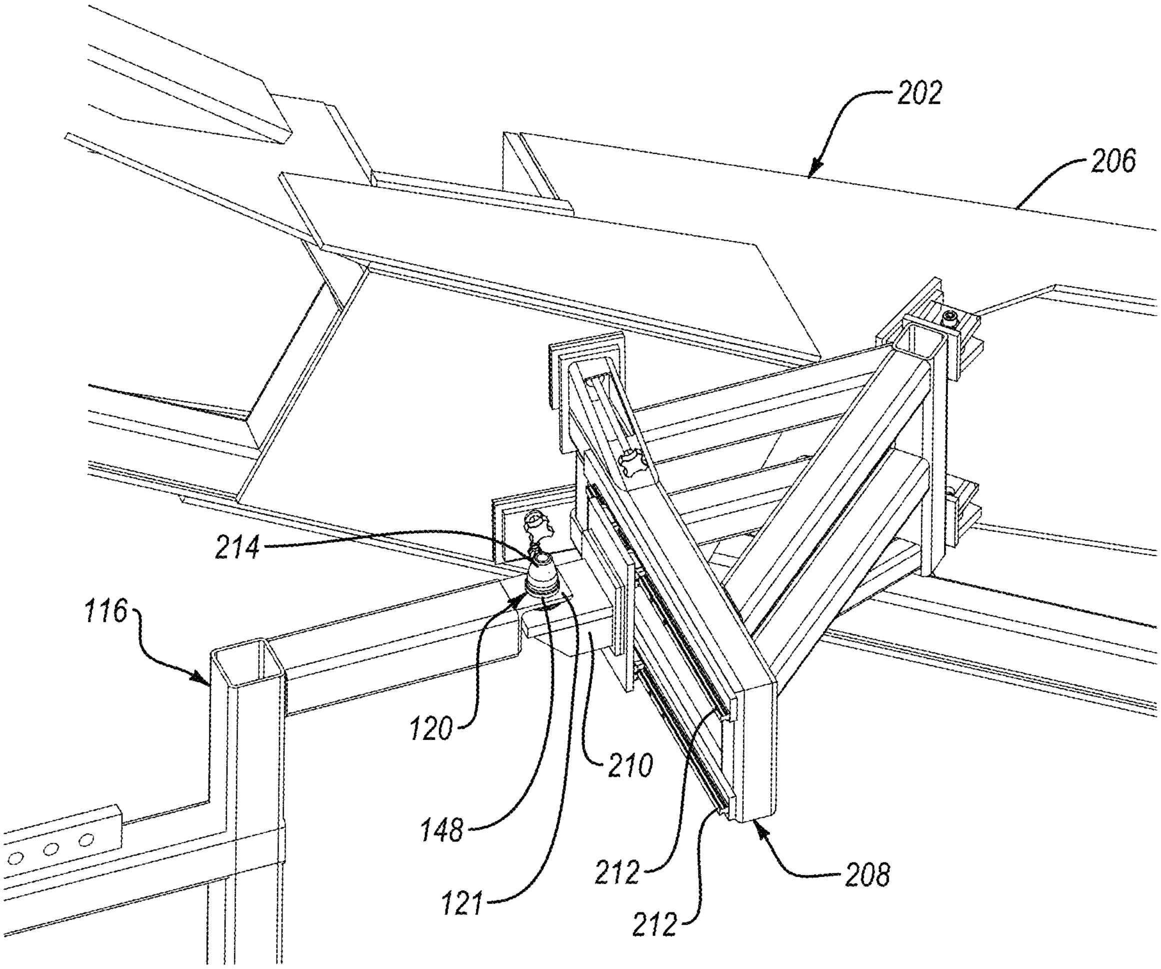
FIG. 9B is a schematic perspective view of the mounting fixture of FIG. 9A, with a coupled hoist frame, according to one or more examples of the present disclosure.

As shown in FIG. 9A, the mount 210 includes a pin 214 extending from an upper surface of the mount 210. One of the plurality of jig-attachment features 120 of the hoist frame 116 is configured to engage with a corresponding mount 210, via the pin 214. To facilitate the engagement with the mount 210, each one of the plurality of jig-attachment features 120 includes a bushing 148. The bushing 148 is a hollow cylindrical component extending through an attachment surface 121 that is configured to be fitted around the pin 214 on a corresponding mount 210. Referring to FIG. 9B, one of the plurality of jig-attachment features 120 is coupled to the corresponding mount by engaging the pin 214 with the bushing 148. That is, the bushing 148 is fitted around the pin 214 to securely attach the jig-attachment feature 120 to the assembly jig 202. Once each one of the plurality of jig-attachment features 120 is attached to a corresponding one of the plurality of mounting fixtures 208, the weight of the hoist frame 116 is supported by the assembly jig 202. The hoist frame 116 may be moved, relative to the main body 206 of the assembly jig 202 by sliding each one of the plurality of jig-attachment features 120 along the at least one linear rail 212 of the corresponding mount 210. Accordingly, the hoist frame 116 may be slid along the at least one linear rail 212 to bring the hoist frame 116 adjacent to the assembled structure 204. This positioning enables the plurality of clamping devices 122 to be in close proximity to the plurality of structure-attachment elements 102. Consequently, the plurality of clamping devices 122 are in a position to be clamped onto the plurality of structure-attachment elements 102, thereby coupling the hoist tool 100 to the assembled structure 204.

Figure 10:
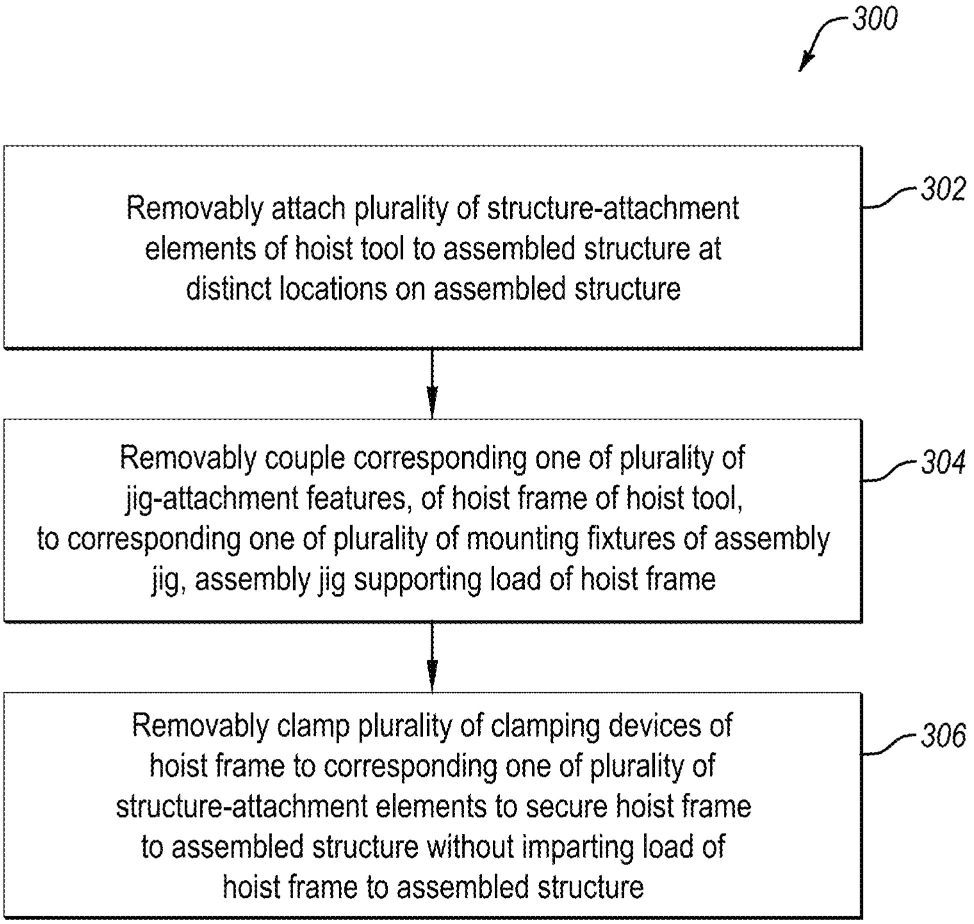
FIG. 10 is a schematic flow diagram of a method of coupling a hoist tool to an assembled structure within an assembly jig, according to one or more examples of the present disclosure.

Referring to FIG. 10, according to some examples, a method 300 of coupling a hoist tool 100 to an assembled structure 204 within an assembly jig 202 is shown. The method 300 includes the step of (block 302) removably attaching a plurality of structure-attachment elements 102 of the hoist tool 100 to the assembled structure 204 at distinct locations on the assembled structure 204. Each one of the plurality of structure-attachment elements 102 includes a sleeve 104 and an attachment plate 108 with a plurality of fastening apertures 110. The sleeve 104 features an external annular groove 106, allowing for the later attachment of a corresponding clamping device. The plurality of fastening apertures 110 serve as points of attachment, for attaching the corresponding one of the plurality of structure-attachment elements 102 to the assembled structure 204. By attaching the plurality of structure-attachment elements 102 at distinct locations on the assembled structure 204, optimal distribution of weight and load-bearing capacity can be considered to ensure stability and integrity during a hoist operation that removes the assembled structure 204 from the assembly jig 202.

The method 300 also includes the step of (block 304) removably coupling a corresponding one of the plurality of jig-attachment features 120, of a hoist frame 116 of the hoist tool 100, to a corresponding one of a plurality of mounting fixtures 208 of the assembly jig 202. Once attached, the assembly jig 202 supports a load (i.e., weight) of the hoist frame 116. Moreover, once attached, the hoist frame 116 is positioned adjacent to the assembled structure 204 for subsequent attachment to the assembled structure 204. Each one of the plurality of mounting fixtures 208 includes a mount 210, having a pin 214, that is selectively slidable along at least one linear rail 212. In engagement, the pin 214 from the mount 210 interfaces with one of the plurality of jig-attachment features 120, via a bushing 148. Once the plurality of jig-attachment features 120 are engaged with the corresponding mount 210 of the assembly jig 202, the hoist frame 116 is selectively movable towards and away from the assembly jig 202, via movement along the at least one linear rail 212. The hoist frame 116 to slid adjacent to the assembled structure 204 for coupling the hoist frame 116 to the assembled structure 204.

The method 300 further includes the step of (block 306) removably clamping a plurality of clamping devices 122 of the hoist frame 116 to a corresponding one of the plurality of structure-attachment elements 102 to secure the hoist frame 116 to the assembled structure 204 without imparting the load of the hoist frame 116 to the assembled structure 204. The plurality of clamping devices 122 each include opposing blade features 130 in which at least one blade of the opposing blade features 130 is selectively movable towards or away from the other blade. Accordingly, the opposing blade features 130 are moved to clamp the plurality of clamp devices 122 to a corresponding one of the plurality of structure-attachment elements 102. Specifically, the opposing blade features 130 are clamping to an external annular groove 106 of the corresponding one of the plurality of structure-attachment elements 102. The clamping of the opposing blade features 130 to the external annular groove 106 ensures a secure hold, firmly attaching the clamping device to the corresponding one of the plurality of structure-attachment elements 102 and providing support for an attached assembled structure.

In some examples, the method 300 also includes selectively pivoting at least one of the opposing blade features 130 about a blade axis 140 in a rotational direction 142 to align the opposing blade features 130 with the external annular groove 106 of the corresponding one of the plurality of structure-attachment elements 102. That is, a clamping position of the opposing blade features 130 can be adjusted, via a pivoting head 141, to account for variability in the position of the corresponding one of the plurality of structure-attachment elements 102, to accommodate for differences in attachment points resulting from allowable assembly variations.

After the hoist frame 116 is securely coupled to the assembled structure 204, the assembled structure 204 is removable from the assembly jig 202 by lifting the hoist tool 100, via a hoist attached to the hoist frame 116.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A hoist tool comprising:

a plurality of structure-attachment elements, wherein each one of the plurality of structure-attachment elements comprises a sleeve, with an external annular groove, and is configured to be attached to an assembled structure within an assembly jig at distinct locations; and a hoist frame comprising:

a structural framework;

a plurality of jig-attachment features on the structural framework; and a plurality of clamping devices, wherein each one of the plurality of clamping devices comprises opposing blade features, which are selectively adjustable, is coupled to the structural framework, and is configured to be removably clamped to the external annular groove of a corresponding one of the plurality of structure-attachment elements;

wherein:

the hoist frame is configured to be removably coupled to the assembly jig, via the plurality of jig-attachment features;

the hoist frame is configured to be removably coupled to the assembled structure, via the plurality of clamping devices; and when the hoist frame is removably coupled to the assembly jig and removably coupled to the assembled structure, the hoist frame is inhibited from imparting load to the assembled structure.

2. The hoist tool of claim 1, wherein each one of the plurality of jig-attachment features comprises a bushing that is configured to engage with a pin on the assembly jig.

3. The hoist tool of claim 1, wherein:

each one of the plurality of structure-attachment elements comprises an attachment plate having a plurality of fastening apertures; and the attachment plate is configured to be attachable to the assembled structure via fasteners inserted through the fastening apertures.

4. The hoist tool of claim 3, wherein each one of the plurality of structure-attachment elements further comprises an interfacing plate attached to the attachment plate by at least one mating-pin of one of the interfacing plate or the attachment plate, wherein the sleeve is coupled to and extends from the interfacing plate.

5. The hoist tool of claim 1, wherein:

the opposing blade features comprises a first blade feature and a second blade feature, opposing the first blade feature; and at least one of the first blade feature or the second blade feature is selectively movable towards or away from the other.

6. The hoist tool of claim 5, wherein the first blade feature has a v-shape with two linear sidewalls, and wherein a portion of each linear sidewall is configured to engage with the external annular groove of a corresponding one of the plurality of structure-attachment elements to provide a clamping force to the external annular groove.

7. The hoist tool of claim 5, wherein:

each one of the plurality of clamping devices comprises an adjustment element that is coupled to the first blade feature and is configured to selectively move the first blade feature along a blade axis towards or away from the second blade feature; and the adjustment element comprises a pivoting head such that the first blade feature is selectively pivotable about the blade axis in a rotational direction, as the first blade feature is selectively moved along the blade axis.

8. The hoist tool of claim 5, wherein at least a portion of the second blade feature is configured to engage with the external annular groove of a corresponding one of the plurality of structure-attachment elements and is configured to provide a clamping force to the external annular groove.

9. The hoist tool of claim 1, further comprising a securement pin configured to extend through a pin aperture of an extension coupler extending from the structural framework of the hoist frame and through the sleeve of a corresponding one of the plurality of structure-attachment elements when the hoist frame is removably coupled to the assembled structure.

10. The hoist tool of claim 1, wherein the plurality of structure-attachment elements comprises at least three structure-attachment elements.

11. A hoist system, comprising:

an assembly jig;

an assembled structure within the assembly jig; and a hoist tool comprising:

a plurality of structure-attachment elements, wherein each one of the plurality of structure-attachment elements comprising a sleeve, with an external annular groove, and is configured to be attached to the assembled structure at distinct locations; and a hoist frame comprising:

a structural framework;

a plurality of jig-attachment features on the structural framework; and a plurality of clamping devices, wherein each one of the plurality of clamping devices comprising opposing blade features, which are selectively adjustable, is coupled to the structural framework, and is configured to be removably clamped to the external annular groove of a corresponding one of the plurality of structure-attachment elements;

wherein:

the hoist frame is configured to be removably coupled to the assembly jig, via the plurality of jig-attachment features;

the hoist frame is configured to be removably coupled to the assembled structure, via the plurality of clamping devices; and when the hoist frame is removably coupled to the assembly jig and removably coupled to the assembled structure, the hoist frame is inhibited from imparting load to the assembled structure.

12. The hoist system of claim 11, wherein:

the assembly jig comprises a main body and a plurality of mounting fixtures extending perpendicularly from the main body; and each one of the plurality of mounting fixtures comprises a mount and at least one linear rail, wherein the mount is selectively slidable along the at least one linear rail to move the mount toward or away from the main body.

13. The hoist system of claim 12, wherein:

the mount of each one of the plurality of mounting fixtures of the assembly jig comprises a pin;

each one of the plurality of jig-attachment features of the hoist frame comprises a bushing; and the bushing is configured to engage with the pin of the mount of a corresponding one of the plurality of mounting fixtures to removably couple the hoist frame to the assembly jig.

14. The hoist system of claim 11, further comprising a securement pin configured to extend through a pin aperture in the structural framework of the hoist frame and through the sleeve of a corresponding one of the plurality of structure-attachment elements when the hoist frame is removably coupled to the assembled structure.

15. The hoist system of claim 11, wherein the assembled structure is an assembled aircraft structure.

16. A method of coupling a hoist tool to an assembled structure within an assembly jig, the method comprising:

removably attaching a plurality of structure-attachment elements of the hoist tool to the assembled structure at distinct locations on the assembled structure;

removably coupling a corresponding one of a plurality of jig-attachment features, of a hoist frame of the hoist tool, to a corresponding one of a plurality of mounting fixtures of the assembly jig, wherein the assembly jig supports a load of the hoist frame; and removably clamping a plurality of clamping devices of the hoist frame to a corresponding one of the plurality of structure-attachment elements to secure the hoist frame to the assembled structure without imparting the load of the hoist frame to the assembled structure.

17. The method of claim 16, further comprising selectively sliding the hoist frame along at least one linear rail of the corresponding one of the plurality of mounting fixtures to slide the plurality of clamping devices of the hoist frame proximate to a corresponding one of the plurality of structure-attachment elements attached to the assembled structure.

18. The method of claim 16, wherein the step of removably clamping the plurality of clamping devices on the hoist frame to the corresponding one of the plurality of structure-attachment elements further comprises selectively adjusting opposing blade features of the plurality of clamping devices to apply a clamping force to an external annular groove of the corresponding one of the plurality of structure-attachment elements.

19. The method of claim 18, further comprising selectively pivoting at least one of the opposing blade features about a blade axis in a rotational direction to align the opposing blade features with the external annular groove of the corresponding one of the plurality of structure-attachment elements.

20. The method of claim 16, further comprising removing the assembled structure from the assembly jig by lifting the hoist tool via a hoist attached to the hoist frame.

* * * * *